(12) United States Patent
Takahashi (10) Patent No.: US 7,748,671 B2
(45) Date of Patent: Jul. 6, 2010

(54) SUCTION CUP DEVICE

(75) Inventor: Shunichi Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 11/841,293

(22) Filed: Aug. 20, 2007

(65) Prior Publication Data

US 2008/0210834 A1 Sep. 4, 2008

(30) Foreign Application Priority Data

Aug. 25, 2006 (JP) .............................. 2006-229117

(51) Int. Cl.
*A45D 42/14* (2006.01)
(52) U.S. Cl. .................................. 248/205.8
(58) Field of Classification Search ............. 248/205.5, 248/205.6, 205.7, 205.8, 206.1, 206.2, 363
See application file for complete search history.

(56) References Cited

U.S. PATENT DOCUMENTS

D548,227 S * 8/2007 Wang et al. ................. D14/239
2007/0138358 A1* 6/2007 Chang ...................... 248/205.5

FOREIGN PATENT DOCUMENTS

| JP | 60-21027 | 2/1985 |
| JP | 60-109610 | 6/1985 |
| JP | 3014841 | 6/1995 |
| JP | 3084140 | 12/2001 |

OTHER PUBLICATIONS

U.S. Appl. No. 12/413,218, filed Mar. 27, 2009, Takahashi, et al.
U.S. Appl. No. 12/413,191, filed Mar. 27, 2009, Takahashi, et al.

* cited by examiner

*Primary Examiner*—J. Allen Shriver, II
*Assistant Examiner*—Erin Smith
(74) *Attorney, Agent, or Firm*—Oblon, Spivak, McClelland, Maier & Neustadt, L.L.P.

(57) ABSTRACT

Herein disclosed a suction cup device including: a case; a suction cup of which a surface on one side in the thickness direction thereof is a suction surface and a surface on the other side is a back surface; a displacement mechanism provided in the case and operative to support a central part in the radial direction of the back surface of the suction cup in such a manner that the central part can be displaced in the thickness direction; and a contact part which is provided in the case and which, when the suction surface makes suction contact with a surface to be sucked, can make contact with a part, on the outside of the suction contact part of the surface to be sucked, of the surface to be sucked, wherein the contact part includes a plurality of contact elements spaced from each other and making contact with a plurality of parts of said surface to be sucked which are spaced at intervals in the circumferential direction of the suction cup.

15 Claims, 8 Drawing Sheets

SUCTION CUP DEVICE

CROSS REFERENCES TO RELATED APPLICATIONS

The present invention contains subject matter related to Japanese Patent Application JP 2006-229117 filed in the Japan Patent Office on Aug. 25, 2006, the entire contents of which being incorporated herein by reference.

BACKGROUND OF THE INVENTION

1. Field of the Invention

The present invention relates to a suction cup (sucker) device.

2. Description of the Related Art

Suction cup devices for attaching goods to wall surfaces or the like have been proposed.

This type of suction cup device includes a case, a suction cup (sucker), a displacement mechanism provided in the case and operative to support a central part of the suction cup in such a manner that the central part can be displaced, and a contact part provided in the case and capable of making contact with a surface to be sucked or with the back surface of the suction cup.

After the suction cup makes suction contact with the surface to be sucked, the contact part is put into contact with the surface to be sucked or with the back surface of the suction cup, and the central part of the suction cup is spaced away from the surface to be sucked by the displacement mechanism, whereby the suction cup device is put in suction contact with the surface to be sucked in a chatterless stable state.

The contact part has been formed in an annular shape extending continuously along the outer periphery of the suction cup (refer to Japanese Utility Model No. 3084140 as Patent Document 1, and Japanese Utility Model No. 3014841 as Patent Document 2).

SUMMARY OF THE INVENTION

Therefore, where the surface to be sucked is a curved surface, it may be impossible to put the contact part in contact with the surface to be sucked in a stable condition. In such a case, it is difficult to displace the central part of the suction cup in a direction for spacing away from the surface to be sucked, and it is therefore difficult to attach the suction cup device to the surface to be sucked in a stable condition.

Thus, there is a need for a suction cup device advantageous in being attached to a surface to be sucked in a chatterless stable condition.

In order to meet the above-mentioned need, according to an embodiment of the present invention, there is provided a suction cup device including: a case; a suction cup of which a surface on one side in the thickness direction thereof is a suction surface and a surface on the other side is a back surface; a displacement mechanism provided in said case and operative to support a central part in the radial direction of said back surface of said suction cup in such a manner that said central part can be displaced in said thickness direction; and a contact part which is provided in said case and which, when said suction surface makes suction contact with a surface to be sucked, can make contact with a part, on the outside of the suction contact part of said surface to be sucked, of said surface to be sucked, wherein said contact part includes a plurality of contact elements spaced from each other and making contact with a plurality of parts of said surface to be sucked which are spaced at intervals in the circumferential direction of said suction cup.

Besides, according to another embodiment of the present invention, there is provided a suction cup device including: a case; a suction cup of which a surface on one side in the thickness direction thereof is a suction surface and a surface on the other side is a back surface; a displacement mechanism provided in said case and operative to support a central part in the radial direction of said back surface of said suction cup in such a manner that said central part can be displaced in said thickness direction; and a contact part which is provided in said case and which, when said suction surface makes suction contact with a surface to be sucked, can make contact with an outer peripheral part of said back surface of said suction cup, wherein said contact part includes a plurality of contact elements spaced from each other and making contact with a plurality of parts of said back surface which are spaced at intervals in the circumferential direction.

According to the present invention, the case is provided with the plurality of contact elements spaced from each other at intervals in the circumferential direction of the suction cup; therefore, even where the surface to be sucked is a curved surface, each of the contact elements spaced from each other is securely put into contact with the surface to be sucked or with the back surface of the suction cup, so that the case can be attached to the surface to be sucked in a stable condition.

DETAILED DESCRIPTION OF THE PREFERRED EMBODIMENTS

Now, some embodiments of the present invention will be described below referring to the drawings.

First Embodiment

Figure 1:
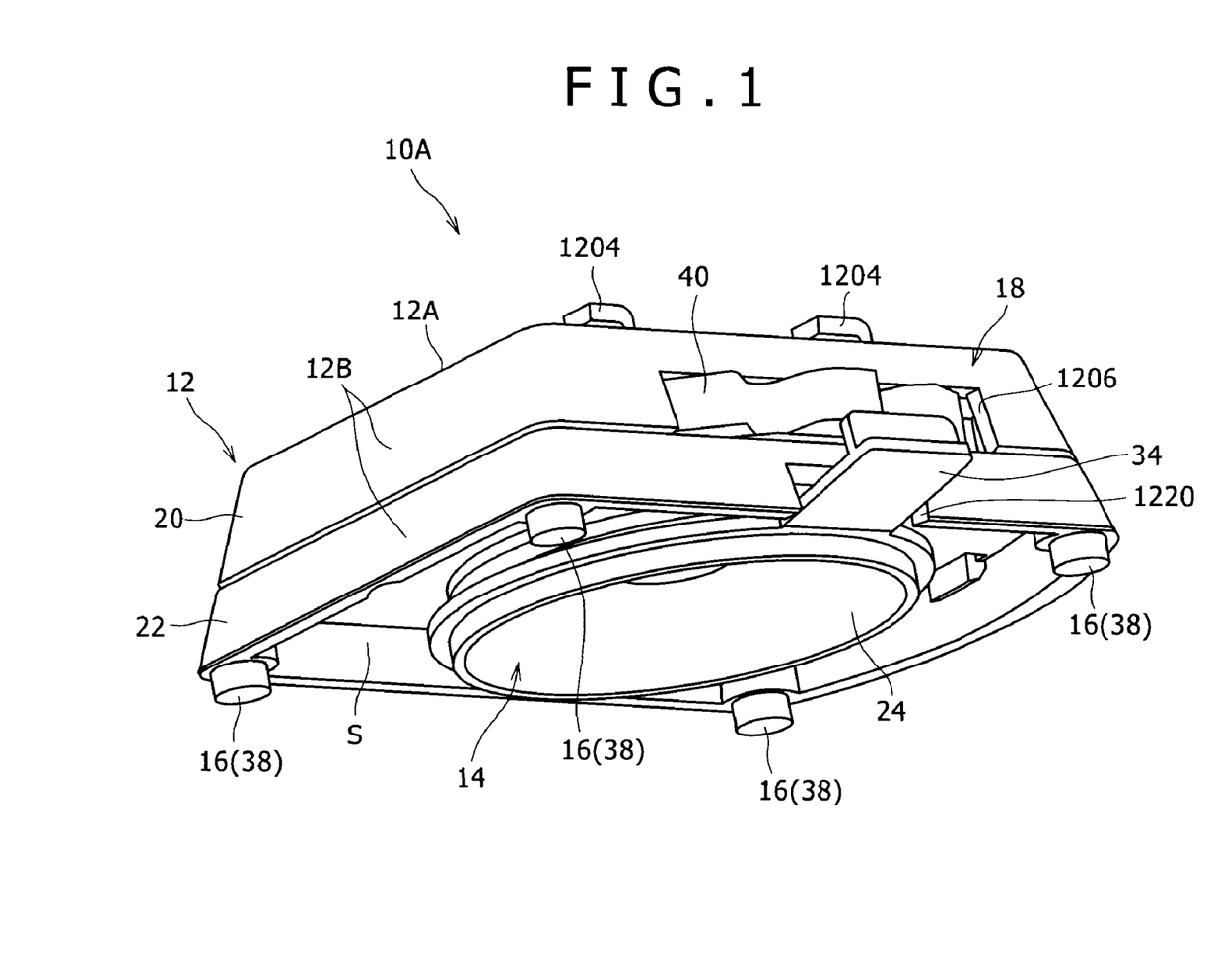
FIG. 1 is a perspective view of a suction cup device 10A according to a first embodiment of the present invention.
Figure 2:
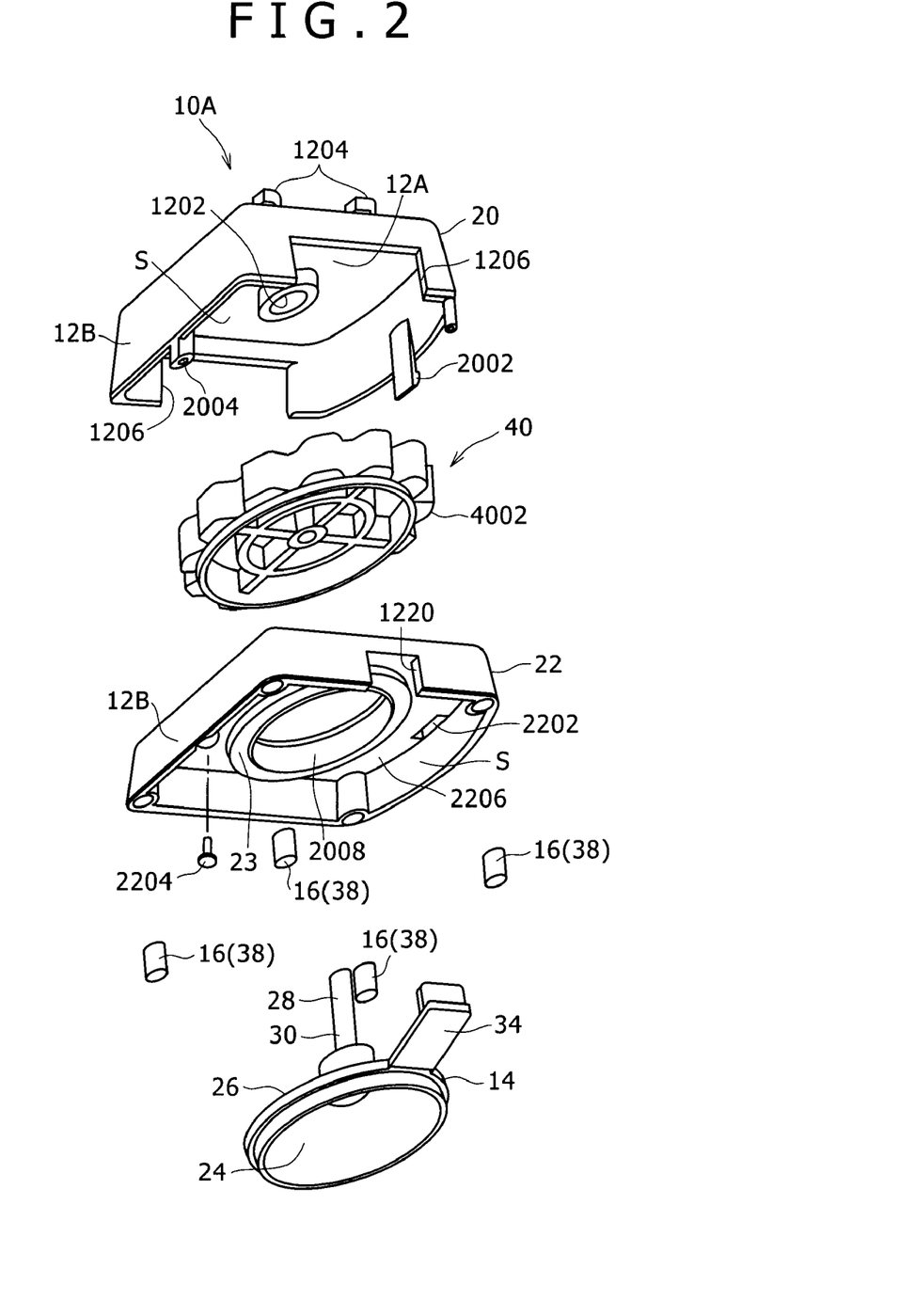
FIG. 2 is an exploded perspective view of the suction cup device 10A.
Figure 3:
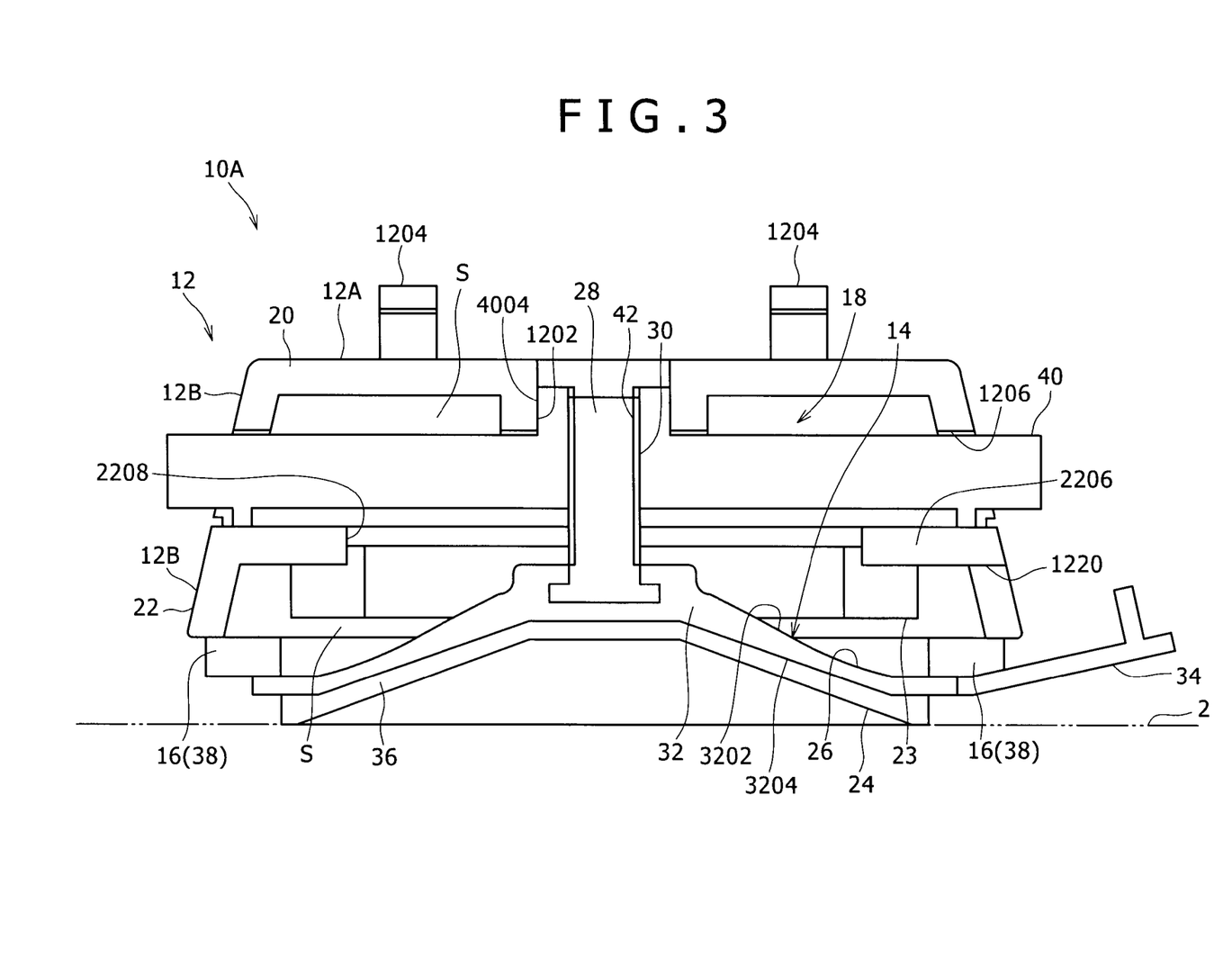
FIG. 3 is an illustration of the operation of the suction cup device.
Figure 4:
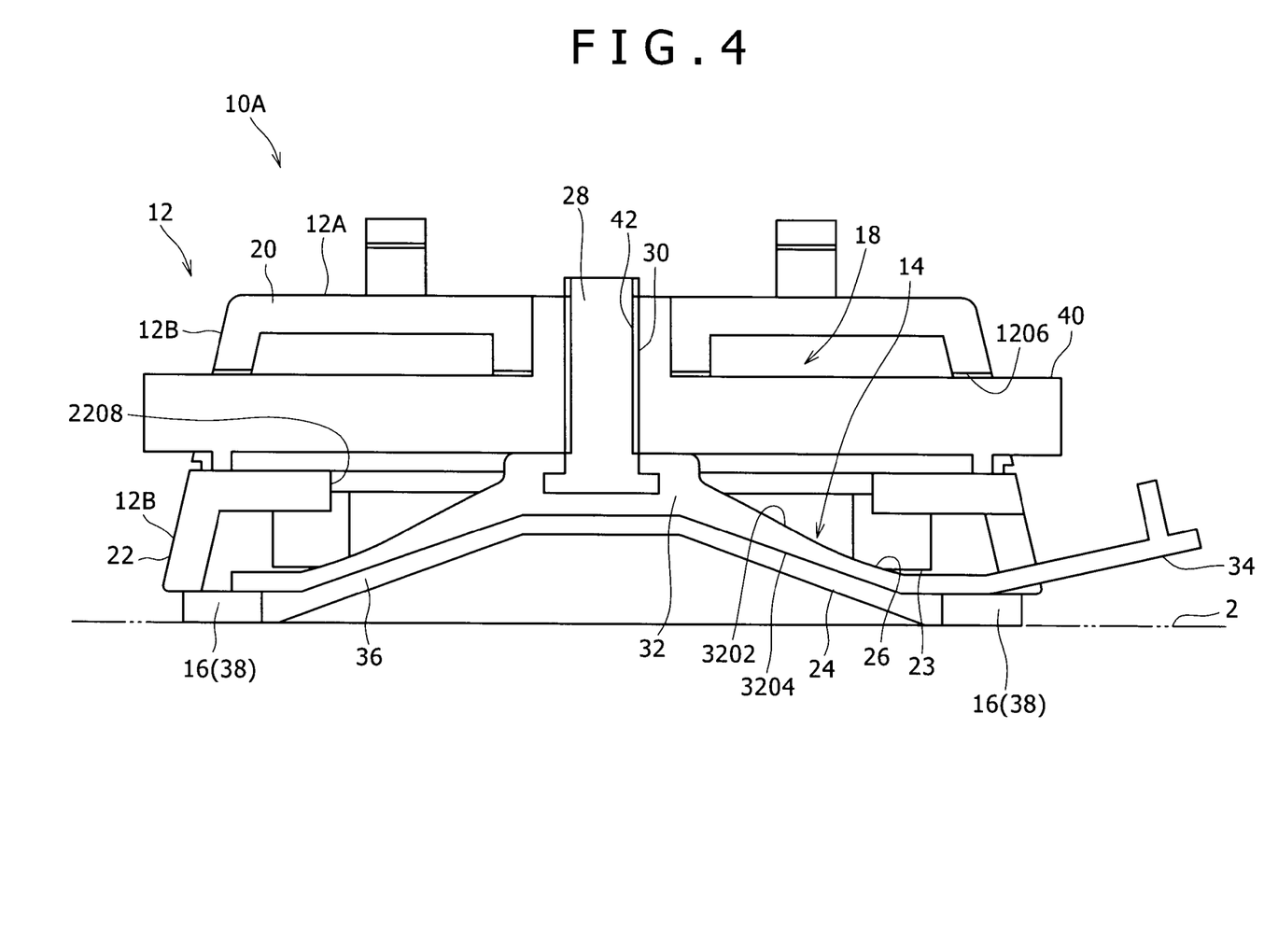
FIG. 4 is an illustration of the operation of the suction cup device.

FIG. 1 is a perspective view of a suction cup device 10A according to a first embodiment of the present invention, FIG. 2 is an exploded perspective view of the suction cup device 10A, and FIGS. 3 and 4 illustrate the operation of the suction cup device 10A.

The suction cup device 10A shown in FIG. 1 is a device used, for example, for supporting a display panel of a car navigation system or a television system on a dashboard in a compartment of an automobile, or for supporting a controller for remote control of various on-vehicle apparatuses or the like.

The suction cup device 10A includes a case 12, a suction cup 14, a contact part 16, a displacement mechanism 18 and the like.

The displacement mechanism 18 includes a shaft 28, a dial 40 and the like.

As shown in FIGS. 1 to 4, the case 12 has a rectangular upper wall 12A, and a peripheral wall 12B perpendicularly extended from the four edges of the periphery of the upper wall 12A. The upper wall 12A and the peripheral wall 12B define a containing space S which opens to the lower side. The suction cup 14 and the dial 40 (described later) are disposed in the containing space S.

In this embodiment, the case 12 includes an upper split body 20 and a lower split body 22 coupled to each other.

The upper split body 20 includes the upper wall 12A and an upper half of the peripheral wall 12B.

The lower split body 22 includes a lower half of the peripheral wall 12B and an intermediate wall 2206 provided at the upper end of the lower half so as to face the upper wall 12A.

The upper wall 12A is provided with a center hole 1202 penetrating the center thereof.

In addition, the upper wall 12A is provided, erected thereon, with a plurality of attaching pieces 1204 for attaching the above-mentioned display panel or controller.

Besides, that part of the upper split body 20 which constitutes the peripheral wall 12B is provided with openings 1206 through which the dial 40 is permitted to protrude.

The intermediate wall 2206 is parallel to the upper wall 12A, and the intermediate wall 2206 is provided with an engaging hole 2202 and a passing hole for passing a screw 2204 therethrough.

As shown in FIG. 2, the upper split body 20 and the lower split body 22 are coupled to each other by a method in which an engaging claw 2002 of the upper split body 20 is engaged into the engaging hole 2202 in the intermediate wall 2206 of the lower split body 22, and the screw 2204 passed from the lower side of the lower split body 22 is screw engaged with a boss part 2004 of the upper split body 20.

The intermediate wall 2206 is provided, penetrating the center thereof, with a circular hole 2208 having a size corresponding to the outer peripheral part of the suction cup 14, and a pressing member 23 is fitted to the inner peripheral edge of the circular hole 2208 from the lower side of the intermediate wall 2206.

The pressing member 23 is so provided that it can make contact with an outer peripheral part of the back surface 26 of the suction cup 14.

The dial 40 is screw engaged with a male screw 30 of the shaft 28 (described later), and is operative to vary the distance between the case 12 and a central part of the suction cup 14 in the longitudinal direction of the shaft 28 by being rotated.

The dial 40 is provided at its outer peripheral part with a plurality of projected parts 4002 spaced at intervals in the circumferential direction so as to permit easy rotation of the dial 40. In addition, as shown in FIG. 3, the dial 40 is penetratingly provided with a female screw 42 in a central part thereof, and is projectingly provided at its upper surface with a boss part 4004 which is rotatably inserted in the center hole 1202.

The dial 40 is disposed in the containing space S on the lower side of the upper wall 12A and on the upper side of the intermediate wall 2206, and opposite outer peripheral parts thereof protrude respectively through the openings 1206 to the outside of the case 12. The boss part 4004 of the dial 40 is inserted in the center hole 1202, whereby the dial 40 is rotatably supported, and, in addition, the dial 40 is prevented from moving along the center axis of a suction surface 24 (in the axial direction of the center hole 1202), by the upper edges of the openings 1206 and the upper surface of the intermediate wall 2206.

As shown in FIGS. 1 to 4, the suction cup 14 is circular disk-like in shape, its surface on one side in the thickness direction is a recessed form suction surface 24, and its surface on the other side is a projected form back surface 26.

The shaft 28 is projected from the back surface 26 of the suction cup 14 in a direction for spacing away from the back surface 26 along the center axis of the suction surface 24, and an outer peripheral surface of the shaft 28 is provided with a male screw 30.

The shaft 28 is passed on the inner side of the pressing member 23 and screw engaged with the female screw 42 of the dial 40. In other words, the dial 40 is located at a position opposite to the suction cup 14, with respect to the case 12 therebetween.

In this embodiment, the suction cup 14 includes a circular disk-like suction cup body 32 constituting the back surface 26, and a gel layer 36 constituting the suction surface 24.

The shaft 28 is projected from the center of the back surface 3202 of the suction cup body 32, and the suction cup body 32 is provided at its outer edge with a detaching piece 34 extending outward in a radial direction of the suction cup 14. The piece 34 is passed through an opening 1220 at the lower end of the peripheral wall 12B and between the contact elements 38 (described later), to be projected to the outside of the case 12.

The suction cup body 32 is formed from an elastic synthetic resin material. Examples of the resin material which can be used include the known various materials conventionally used for suction cups, such as materials based on urethane, styrene, silicone resin or the like.

The gel layer 36 is formed of a gel. As shown in FIG. 3, a recessed form attaching surface 3204 is formed at the surface of the suction cup body 32 located opposite to the back surface 3202, the gel layer 36 is joined to the attaching surface 3204 so as to cover the attaching surface 3204, and the suction surface 24 is composed of the surface of the gel layer 36.

Examples of the gel includes gels based on a synthetic resin, such as gels based on polyethylene, styrene, silicone resin or the like. As the polyethylene-based gel, for example, the gel commercially available under the product name "COSMO GEL" from Cosmo Instruments Co., Ltd. can be used. As the styrene-based gel, for example, the gel commercially available under the product name "NAGFLEX" from Inoac Corporation can be used. As the silicone-based gel, for example, the gel commercially available under the product name "αGEL" (alpha gel) from Geltec Co., Ltd. can be used.

The joining of the gel layer 36 to the attaching surface 3204 can be conducted, for example, by two-color molding, adhesion with an adhesive, or the like.

The contact part 16 is provided in the case 12 so that it can make contact with parts of the surface to be sucked 2 on the outside of the suction contact parts of the surface to be sucked 2 when the suction surface 24 make suction contact with the surface to be sucked 2.

More in detail, the contact part 16 includes a plurality of contact elements 38 spaced from each other and making contact with a plurality of parts of the surface to be sucked 2 which are spaced at intervals in the circumferential direction of the suction cup 14.

In this embodiment, each of the contact elements 38 includes each of mutually independent members attached to parts spaced at intervals in the circumferential direction of the peripheral wall 12B, at the lower end of the lower split body 12B constituting the peripheral wall 12B. In this embodiment, the contact elements 38 are provided at four corners of the lower end of the lower split body 12B. Each of the contact elements 38 is cylindrical in shape, and is fitted in one of holes formed at the four corners of the lower end of the lower split body 12B.

The contact elements 38 are formed from an elastic material in this embodiment. As the elastic material, for example, polyurethane foam can be used. One example of the usable polyurethane foam is commercially available under the product name "PORON" from Inoac Corporation.

The displacement mechanism 18 is provided between the case 12 and the suction cup 14 for the purpose of supporting a central part in the radial direction of the suction cup 14 so that the central part can be displaced in directions away from and toward the surface to be sucked 2. More specifically, the displacement mechanism 18 is for relative displacement of the case 12 and the suction cup 14 along the center axis of the suction cup 14 (the suction surface 24).

The displacement mechanism 18 includes the shaft 28, the male screw 30, the female screw 42, and the dial 40 which have been mentioned above.

Specifically, as shown in FIG. 3, the suction cup 14 is put in the state of being located downwardly away from the upper wall 12A (in the state of being projected from the lower end of the peripheral wall 12B) by the displacement mechanism 18, the suction surface 24 is made to front on the surface to be sucked 2 by gripping the case 12, and the suction cup 14 is brought into contact with the surface to be sucked 2. As a result, first, the outer peripheral part of the suction surface 24 is pressed against the surface to be sucked 2, and, in this condition, an air-filled space is formed between the suction surface 24 and the surface to be sucked 2.

When the case 12 is pressed further toward the surface to be sucked 2, a central part of the suction cup body 36 is deformed toward the surface to be sucked 2 because the male screw 30 of the shaft 28 is in screw engagement with the female screw 42 of the dial 40, whereby the whole area of the suction surface 24 is put into close contact with the surface to be sucked 2. As a result, the air having been present in the above-mentioned space is discharged from between the suction surface 24 and the surface to be sucked 2, a substantial vacuum is formed between the suction surface 24 and the surface to be sucked 2, and the suction surface 24 is put into suction contact with the surface to be sucked 2, whereby the suction cup device 10A is attached to the surface to be sucked 2.

When the dial 40 is rotated in this condition, the case 12 is moved toward the surface to be sucked 2; in other words, the shaft 28 is gradually displaced toward the upper side of the upper wall 12A, and the plurality of contact elements 38 come into contact with parts of the surface to be sucked 2 on the outer side in the radial direction of the suction cup 14. In addition, the pressing member 23 comes into contact with an outer peripheral part of the back surface 26 of the suction cup 14, and presses the outer peripheral part of the suction cup 14 against the surface to be sucked 2.

When the dial 40 is further rotated continually, the case 12 tends to be moved toward the surface to be sucked 2 but cannot be moved toward the surface to be sucked 2, since the plurality of contact elements 38 are in contact with the parts of the surface to be sucked 2 on the outer side in the radial direction of the suction cup 14. As a result, the central part of the suction cup 14 is forcibly displaced away from the surface to be sucked 2, as shown in FIG. 14. This enhances the degree of adhesion (close contact) of the suction cup 14. In addition, since the plurality of contact elements 38 are in contact with the surface to be sucked 2 and since the pressing member 23 is pressing the outer peripheral part of the suction cup 14 against the surface to be sucked 2, the case 12 is attached to the surface to be sucked 2 in the condition where the case 12 is prevented from chattering.

According to this embodiment, the following effects are exhibited.

The case 12 is provided with the plurality of contact elements 38 spaced from each other at intervals in the circumferential direction of the suction cup 14. Therefore, even in the case where the dashboard of an automobile to which a display panel or a controller is attached is a curved surface, the mutually spaced contact parts 16 can make assured contact with the surface to be sucked 2, and the case 12 can be attached to the surface to be sucked 2 in a stable condition.

Therefore, the display panel or controller attached to the suction cup device 10A can be restrained from chattering, which promises easy visibility of a display panel or is advantageous in enhancing the operability of a controller.

The present invention will be described more in detail by referring to a comparative example.

Figure 5A:
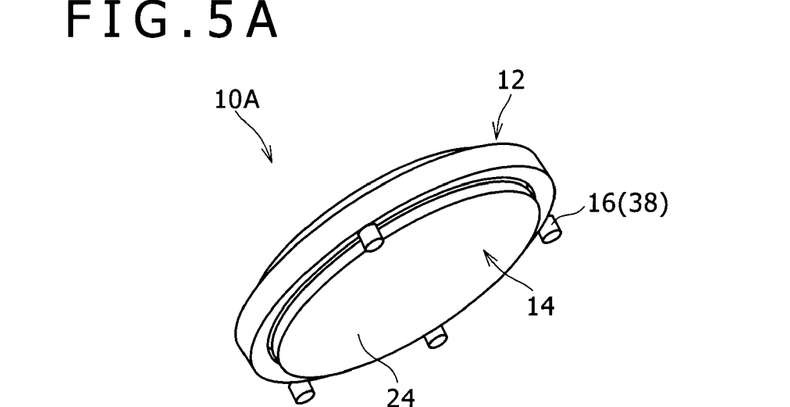
FIG. 5A is a perspective view of the suction cup device 10A in this embodiment.
Figure 5B:
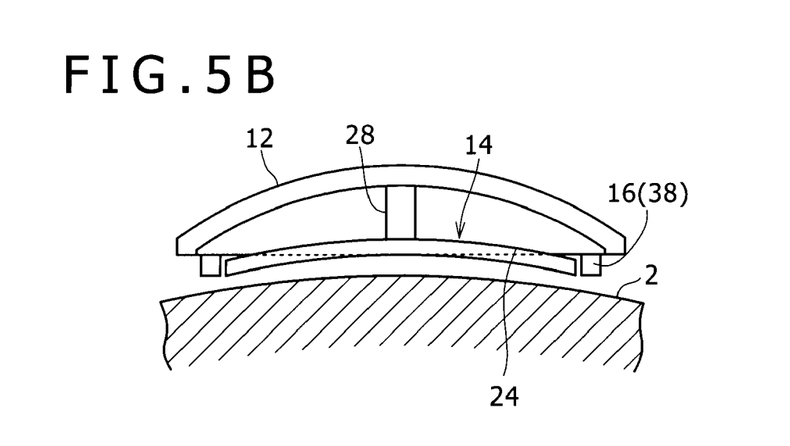
FIGS. 5B and 5C illustrate the case where the suction cup device 10A is put into suction contact with a curved surface to be sucked 2.
Figure 5C:
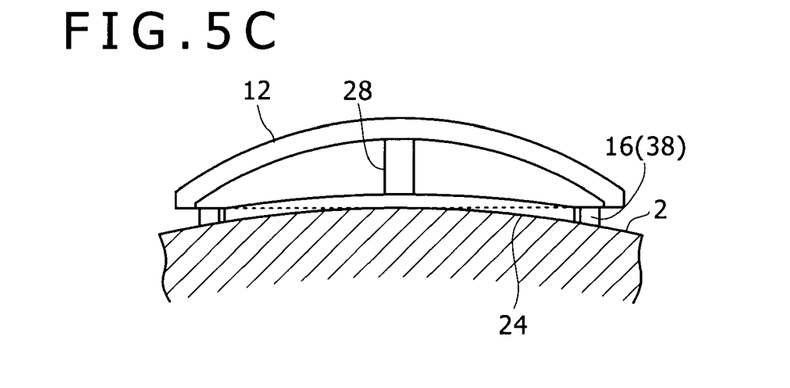
Figure 6A:
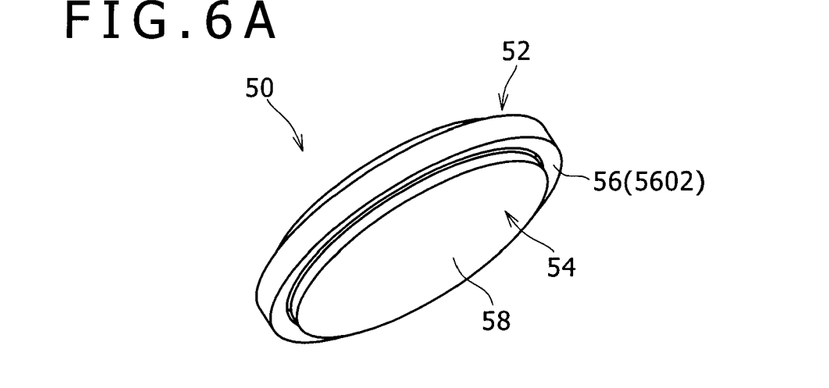
FIG. 6A is a perspective view of the suction cup device 10A according to a comparative example.
Figure 6B:
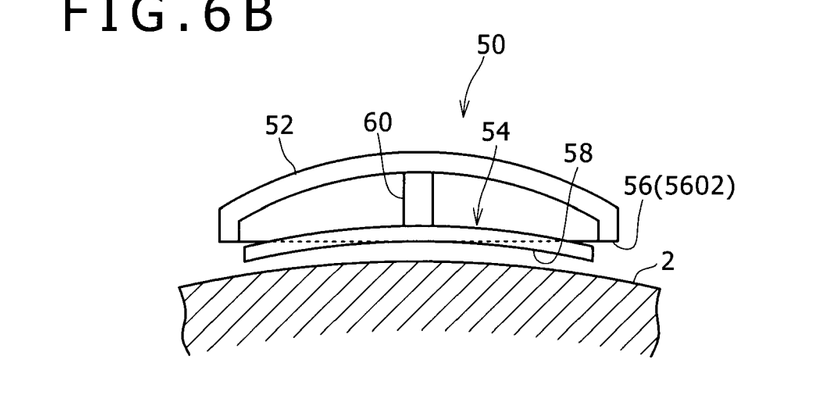
FIGS. 6B and 6C illustrate the case where the suction cup device 10A is put into suction contact with a curved surface to be sucked 2.
Figure 6C:
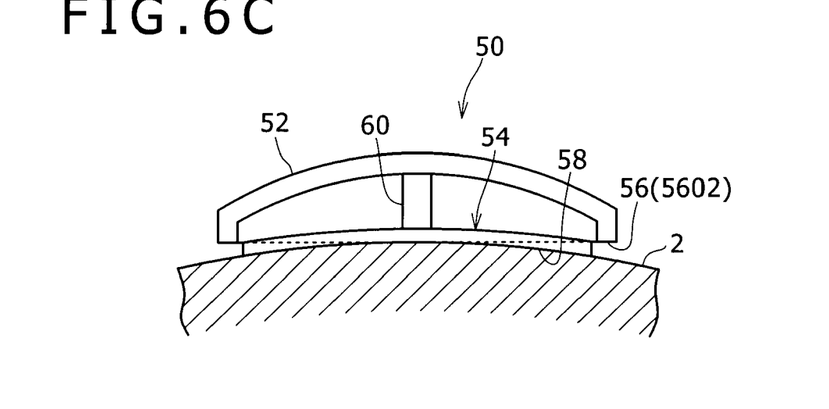

FIG. 6A is a perspective view of a suction cup device 50 according to a comparative example, and FIGS. 6B and 6C illustrate the case where the suction cup device 50 is put into suction contact with a curved surface to be sucked 2. Incidentally, in FIGS. 6 and 5, the case is drawn to have a circular shape.

As shown in FIGS. 6A to 6C, the suction cup device 50 in the comparative example has a case 52 and a suction cup 54 similar to those in the suction cup device 10A in the embodiment, but a contact part 56 is different from the contact part 16 of the suction cup device 10A in the embodiment and is formed to extend annularly along the whole circumference in the circumferential direction of the suction cup 54, and the lower end 5602 of the contact part 56 is located on the same plane.

In the suction cup device 50 in the comparative example, when a suction surface 58 of the suction cup 54 is made to front on a surface to be sucked 2 and pressed against the surface to be sucked 2 by gripping a case 52 and the case 52 is pressed toward the surface to be sucked 2, as shown in FIG. 6B, the suction cup 54 is put into suction contact with the surface to be sucked 2 in the same manner as in the embodiment.

When the dial (not shown) is rotated in this condition so as to move the case 52 toward the surface to be sucked 2, in other words, so as to gradually displace a shaft 60 upwards, the lower end of the contact part 56 is gradually brought closer to the surface to be sucked 2. After a while, as shown in FIG. 6C, only the part facing the highest part of the curved surface to be sucked 2, of the lower end 5602 of the contact part 56 makes contact with the surface to be sucked 2, whereas the other part of the lower end 5602 of the contact part 56 is left spaced from the surface to be sucked 2.

Therefore, since only a part of the contact part 56 is in contact with the surface to be sucked 2, a displacement of a central part of the suction cup 54 away from the surface to be sucked 2 by rotating the dial displaces the central part of the suction cup 54 not in a direction orthogonal to the surface to be sucked 2 but in an inclined direction, so that the suction cup 54 would be released from the surface to be sucked 2.

Accordingly, it is difficult to attach the case 52 to the surface to be sucked 2 in a stable state free of chattering.

FIG. 5A is a perspective view of the suction cup device 10A according to this embodiment of the present invention, and FIGS. 5B and 5C illustrate the case where the suction cup device 10A is put into suction contact with a curved surface to be sucked 2.

As shown in FIG. 5A, in the suction cup device 10A in this embodiment, a case 12 is provided with a plurality of contact parts 16 spaced at intervals in the circumferential direction of a suction cup 14.

As shown in FIG. 5B, when a suction surface 24 of the suction cup 14 is made to face the surface to be sucked 2 and pressed against the surface to be sucked 2 by gripping the case 12 and the case 12 is pressed toward the surface to be sucked 2, the suction cup 14 is put into suction contact with the surface to be sucked 2.

When the dial (not shown) is rotated in this condition so as to move the case 12 toward the surface to be sucked 2, in other words, so as to gradually displace the shaft 28 upwards, the lower ends of a plurality of contact parts 38 are gradually brought closer to the surface to be sucked 2. After a while, the lower ends of the plurality of the contact parts 38 are put in contact with the curved surface to be sucked 2, as shown in FIG. 5C. Namely, since the plurality of contact parts 38 are spaced from each other, two each of the contact parts can be put in contact with each of parts on both sides of the highest part of the surface to be sucked 2.

Therefore, since each of the contact parts 38 is assuredly put in contact with the surface to be sucked 2, it is possible by further rotating the dial to forcibly displace a central part of the suction cup 14 away from the surface to be sucked 2, and thereby to attach the case 12 to the surface to be sucked 2 in a stable state free of chattering, which is advantageous over the case of the comparative example.

Especially, in this embodiment, the contact parts 38 is formed from an elastic material, so that the contact parts 38 can be assuredly put into contact with the curved surface to be sucked 2, which is more advantageous in attaching the case 12 to the surface to be sucked 2 in a stable condition.

Incidentally, such a configuration of a displacement mechanism 62 can naturally be applied also to the case of putting a plurality of contact parts 38 into contact with an outer peripheral part of the back surface 26 of the suction cup 14; in that case, a pressing member 23 is omitted.

Second Embodiment

Now, a second embodiment of the present invention will be described below referring to FIGS. 7A and 7B.

Figure 7A:
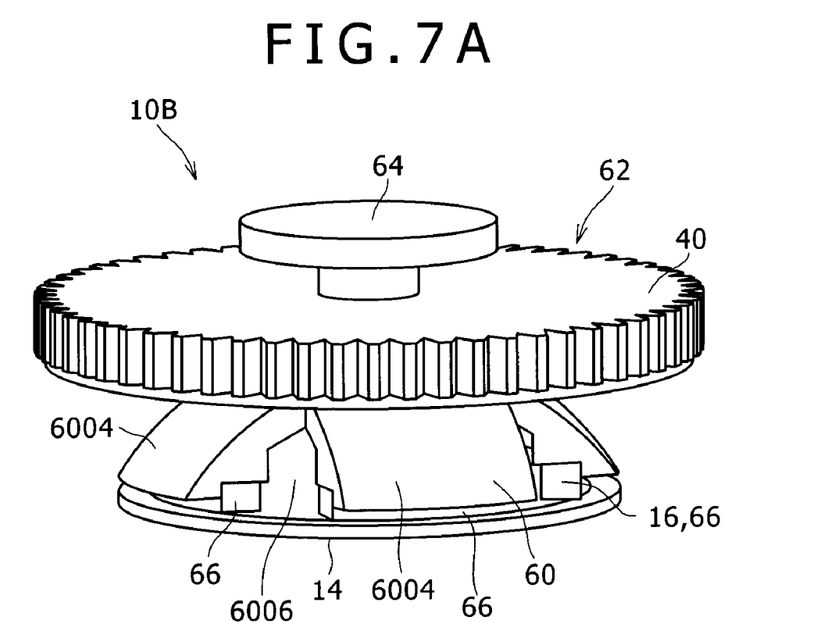
FIG. 7A is a perspective view of a suction cup device according to a second embodiment of the present invention.
Figure 7B:
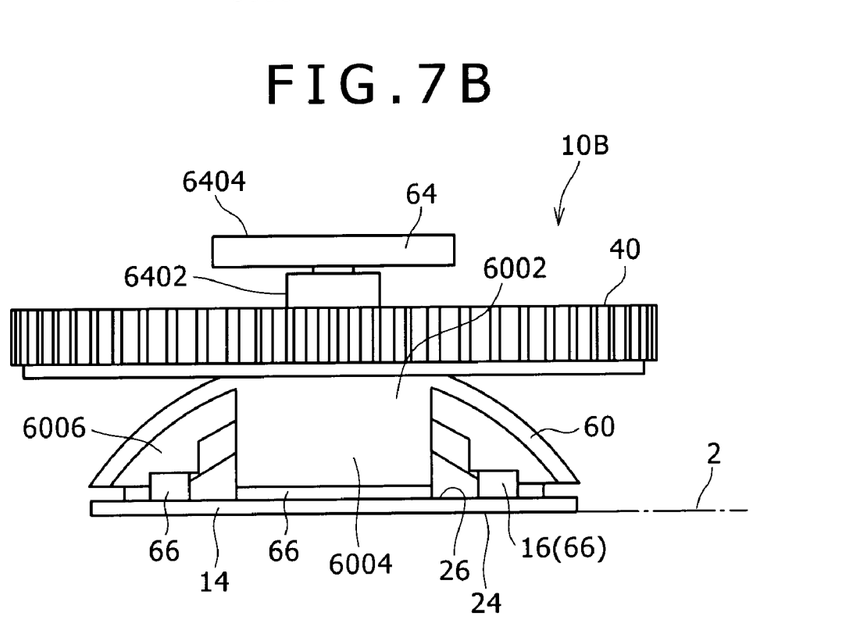
FIG. 7B is a front view of the same.

FIG. 7A is a perspective view of a suction cup device 10B according to the second embodiment, and FIG. 7B is a front view of the same. Incidentally, the same parts and members as those in the first embodiment above will be denoted by the same symbols as above, in the following description.

The suction cup device 10B includes a case 60, a suction cup 14, contact parts 16, a displacement mechanism 62 and the like. The displacement mechanism 62 includes a shaft 28 (not seen in FIGS. 7A and 7B), a dial 40 and the like.

The suction cup 14 is configured in the same manner as in the first embodiment above. Specifically, as shown in FIGS. 3 and 4, a shaft 28 is projected from the back surface 26 of the suction cup 14 in a direction of going away from the back surface 26 along the center axis of a suction surface 24, and an outer peripheral surface of the shaft 28 is provided with a male screw 30.

The case 60 has an upper wall 6002 and a plurality of peripheral walls 6004 perpendicularly extended from the periphery of the upper wall 6002 and spaced from each other at intervals in the circumferential direction of the upper wall 6002. Cutouts 6006 opening to the lower side are located between the peripheral walls 6004, and the case 60 as a whole is in a curved shape projected to the upper side. Therefore, the case 60 has the plurality of peripheral walls 6004 located at intervals in the circumferential direction of an outer peripheral part of the suction cup 14. The lower end of each of the peripheral walls 6004 extends in an arcuate shape with a radius corresponding to the outer peripheral part of the suction cup 14.

The shaft 28 protrudes through a hole in the center of the upper wall 6002 of the case 60 to the upper side of the upper wall 6002 of the case 60. As shown in FIGS. 3 and 4, a dial 40 is disposed with its female screw 42 in engagement with the part of the male screw 30 of the shaft 28 protruding to the upper side of the upper wall 6002 of the case 60.

Incidentally, a cap 64 is fixed to the upper end of the shaft 28 protruding to the upper side of the dial 40. The cap 64 has a small diameter part 6402 and a large diameter part 6404.

The contact parts 16 are provided as parts of the case 60 so that they can make contact with an outer peripheral part of the back surface 26 of the suction cup 14 when the suction surface 24 is put into suction contact with a surface to be sucked 2.

More specifically, the contact parts 16 include a plurality of mutually independent contact elements 66 spaced from each other and making contact with a plurality of parts of the back surface 26 of the suction cup 14 which are spaced at intervals in the circumferential direction of the suction cup 14.

Each of the contact elements 66 is attached to the lower end of the peripheral wall 6004, and extends in an arcuate shape with a radius corresponding to the outer peripheral part of the suction cup 14. The material constituting the contact elements 66 is the same as that used in the first embodiment.

The displacement mechanism 62 is provided between the case 60 and the suction cup 14 for the purpose of supporting a central part in the radial direction of the suction cup 14 so that the central part can be displaced away from and toward the surface to be sucked 2. More specifically, the displacement mechanism 62 is for relatively displace the case 60 and the suction cup 14 along the center axis of the suction cup 14 (the suction surface 24).

The displacement mechanism 18 includes the above-mentioned shaft 28, the male screw 30, the female screw 42, and the dial 40.

In use, the suction cup 14 is located away from and on the lower side of the case 60 by the displacement mechanism 62, the suction surface 24 is made to face the surface to be sucked 2 and pressed against the surface to be sucked 2, by gripping the cap 64 or the dial 40. As a result, first, an outer peripheral part of the suction surface 24 is pressed against the surface to be sucked 2, and, in this condition, an air-filled space is formed between the suction surface 24 and the surface to be sucked 2.

When the cap 64 or the dial 40 is further pressed toward the surface to be sucked 2, a central part of the suction cup 14 is deformed toward the surface to be sucked 2, since the male screw 30 of the shaft 28 is in engagement with the female screw 42 of the dial 40. As a result, the whole area of the suction surface 24 is put into close contact with the surface to be sucked 2, air present in the above-mentioned space is discharged from between the suction surface 24 and the surface to be sucked 2, a substantial vacuum is formed between the suction surface 24 and the surface to be sucked 2, and the suction surface 24 is put in suction contact with the surface to be sucked 2, whereby the suction cup device 10A is attached to the surface to be sucked 2.

When the dial 40 is rotated in this condition, the case 12 is moved toward the surface to be sucked 2, the plurality of contact elements 66 are brought into contact with an outer peripheral part of the back surface 26 of the suction cup 14, and an outer peripheral part of the suction cup 14 is pressed against the surface to be sucked 2.

When the dial 40 in this condition is further rotated continually, the case 12 tends to be moved toward the surface to be sucked 2 but cannot be moved toward the surface to be sucked 2 because the plurality of contact elements 66 are in contact with the outer peripheral part of the back surface 26 of the suction cup 14. As a result, the central part of the suction cup 14 is forcibly displaced away from the surface to be sucked 2. By this, the degree of adhesion (close contact) of the suction cup 14 is enhanced. In addition, since the plurality of contact elements 66 are in contact with the outer peripheral part of the back surface 26 of the suction cup 14, the case 12 is attached to the surface to be sucked 2 in the condition where the case 12 is prevented from chattering.

According to the second embodiment as above, the same effects as those in the first embodiment are exhibited.

Incidentally, such a configuration of the displacement mechanism 62 can naturally be applied also to the case where a plurality of contact elements 66 are put into contact with parts of the surface to be sucked 2 on the outer side in the radial direction of the suction cup 14.

Third Embodiment

Now, a third embodiment of the present invention will be described below referring to FIGS. 8A and 8B.

Figure 8A:
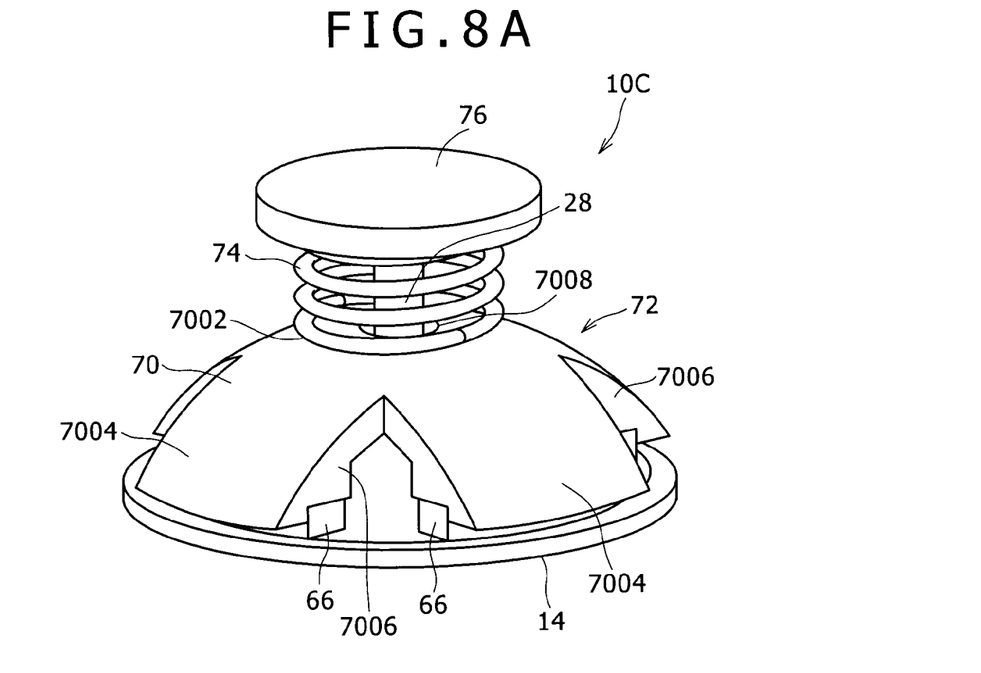
FIG. 8A is a perspective view of a suction cup device according to a third embodiment of the present invention.
Figure 8B:
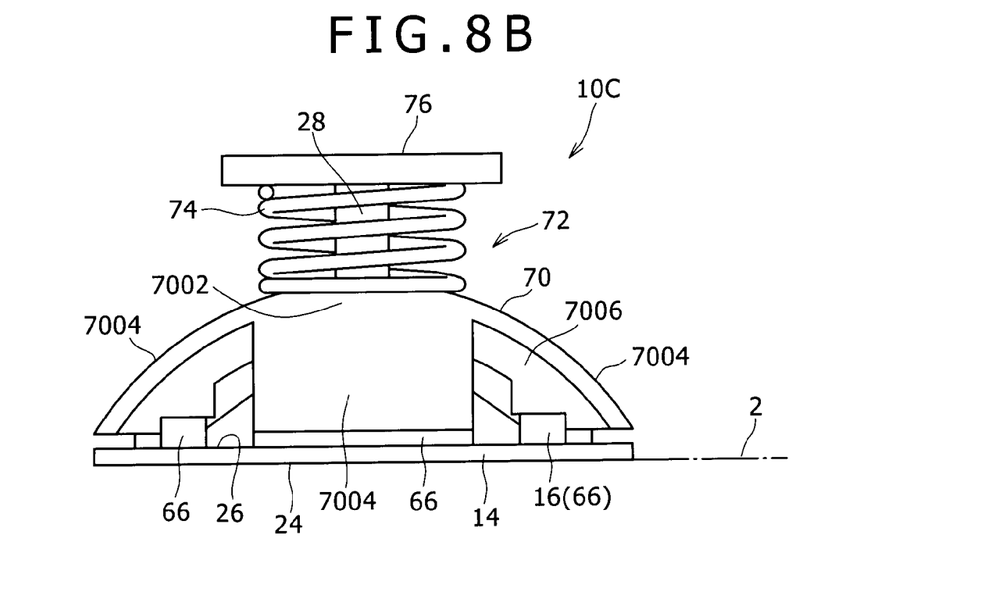
FIG. 8B is a front view of the same.

FIG. 8A is a perspective view of a suction cup device 10C according to the third embodiment, and FIG. 8B is a front view of the same. Incidentally, the same parts and members as those in the first and second embodiments above will be denoted by the same symbols as used above, in the following description.

The suction cup device 10C includes a case 70, a suction cup 14, contact parts 16, a displacement mechanism 72 and the like. The displacement mechanism 72 includes a shaft 28, a coil spring 74 and the like.

The suction cup 14 is configured in the same manner as in the first embodiment. As shown in FIGS. 3 and 4, the shaft 28 is projected from the back surface 26 of the suction cup 14 in a direction of going away from the back surface 26 along the center axis of a suction surface 24.

The case 70 has an upper wall 7002 and a plurality of peripheral walls 7004 perpendicularly extended from the periphery of the upper wall 7002 at position spaced at intervals in the circumferential direction of the upper wall 7002. Cutouts 7006 opening to the lower side are located between the peripheral walls 7004. The case 70 as a whole is in a curved shape projected to the upper side. Therefore, the case 70 has the plurality of peripheral walls 7004 located at intervals in the circumferential direction of an outer peripheral part of the suction cup 14. The lower end of each of the peripheral walls 7004 extends in an arcuate shape with a radius corresponding to the outer peripheral part of the suction cup 14.

The shaft 28 protrudes through a hole 7008 in the center of an upper part of the case 70 to the upper side of the upper wall 7002 of the case 70, and a circular disk-like cap 76 is fixed to the upper end of the shaft 28 protruding to the upper side of the upper wall 7002 of the case 70.

The contact parts 16 are provided as parts of the case 70 so that they can make contact with the outer peripheral part of the back surface 26 of the suction cup 14 when the suction surface 24 is in suction contact with the surface to be sucked 2.

More specifically, the contact parts 16 are spaced from each other, and include a plurality of mutually independent contact elements 66 making contact with a plurality of parts of the back surface 26 of the suction cup 14 which are spaced at intervals in the circumferential direction of the suction cup 14.

Each of the contact elements 66 is attached to the lower end of the peripheral wall 7004, and extends in an arcuate shape with a radius corresponding to the outer peripheral part of the suction cup 14. The material constituting the contact elements 66 is the same as that used in the first embodiment above.

The displacement mechanism 72 is provided between the case 70 and the suction cup 14 for the purpose of supporting a central part in the radial direction of the suction cup 14 so that the central part can be displaced away from and toward the surface to be sucked 2. More specifically, the displacement mechanism 72 is for supporting the central part in such a manner as to permit relative displacement of the case 70 and the suction cup 14 along the center axis of the suction cup 14 (the suction surface 24).

The displacement mechanism 72 includes the above-mentioned shaft 28, the case 70, the coil spring 74, and the cap 76.

To be more specific, by the displacement mechanism 72, in other words, by the elastic force of the coil spring 74, the case 70 and the cap 76 are energized away from each other, and a plurality of contact elements 66 make contact with an outer peripheral part of the back surface 26 of the suction cup 14, so that the central part of the suction cup 14 is in the state of having been displaced closer to the cap 76 than the outer peripheral part of the suction cup 14.

Here, the suction surface 24 is made to front on the surface to be sucked 2 by gripping the cap 76 or the case 70, and the suction cup 4 is pressed against the surface to be sucked 2. By this, first, the outer peripheral part of the suction surface 24 is pressed against the surface to be sucked 2, and, in this condition, an air-filled space is formed between the suction surface 24 and the surface to be sucked 2.

When the cap 76 is further pressed toward the surface to be sucked 2, the coil spring 74 is compressed, the central part of the suction cup 14 is deformed toward the surface to be sucked 2, and the whole area of the suction surface 24 is put into close contact with the surface to be sucked 2. As a result, air present in the above-mentioned space is discharged from between the suction surface 24 and the surface to be sucked 2, a substantial vacuum is formed between the suction surface 24 and the surface to be sucked 2, and the suction surface 24 is put into suction contact with the surface to be sucked 2, whereby the suction cup device 10A is attached to the surface to be sucked 2.

When the hand is taken off the cap 76 in this condition, the case 70 and the cap 76 are energized away from each other by the elastic force of the coil spring 74. In this case, since the plurality of contact elements 66 are in contact with the outer peripheral part of the back surface 26 of the suction cup 14, a central part of the suction cup 14 is forcibly displaced away from the surface to be sucked 2. By this, the degree of adhesion (close contact) of the suction cup 14 is enhanced. In addition, since the plurality of contact elements 66 are in contact with the back surface 26 of the suction cup 14, the case 12 is attached to the surface to be sucked 2 in the condition where the case 12 is prevented from chattering.

According to the third embodiment as above, also, the same effects as in the first and second embodiments can be displayed.

Incidentally, such a configuration of the displacement mechanism 72 can naturally be applied also to the case where a plurality of contact elements 66 are put into contact with parts of a surface to be sucked 2 which are located on the outer side in the radial direction of the suction cup 14.

In the first to third embodiments, a configuration may be adopted in which the contact part 16 is composed of a single member and only the parts for contact with the surface to be sucked or with the back surface 26 of the suction cup 14 are spaced from each other in the circumferential direction of the outer peripheral part of the suction cup 14. However, the configuration in which, as in this embodiment, the contact parts 16 are composed respectively of the contact elements 38, 66 prepared as separate members is advantageous in reducing cost and rendering the suction cup device 10A, 10B, 10C compact.

In addition, as the configuration of the suction surface 24, any of various structures known in the art may be applied. For example, the gel layer 36 may be omitted, and a suction surface may be formed at a surface of the suction cup body 32 located on the opposite side of the back surface 26. It is to be noted here, however, when the suction surface 24 is formed by use of the gel layer 36, the suction surface 24 can be deformed following up to the ruggedness of the surface to be sucked 2 and the suction surface 24 can be put into close contact with the rugged or rough surface without leaving any gap therebetween, even in the case where the surface to be sucked 2 is formed as a grained surface or composed of a minutely rugged surface or a rough surface. Therefore, the suction cup 14 can be securely put into suction contact with the rugged surface or rough surface, which is advantageous in securely attaching various goods to a surface to be sucked 2, such as a grained surface of a dashboard panel.

Besides, while the pressing member 23 for contact with the back surface 26 of the suction cup 14 has been provided in the first embodiment, the pressing member 23 may be omitted in the first embodiment. It is to be noted here, however, that the provision of the pressing member 23 is advantageous in attaching the case 12 to the surface to be sucked 2 in a stable condition.

In addition, while the suction cup devices 10A, 10B, 10C for attaching a display panel or controllers of various on-vehicle apparatuses have been described in the present embodiments, the goods to be supported by the suction cup devices 10A, 10B, 10C are not limited to the goods for on-vehicle apparatuses, and the suction cup devices can be applied to various goods.

It should be understood by those skilled in the art that various modifications, combinations, sub-combinations and alterations may occur depending on design requirements and other factors insofar as they are within the scope of the appended claims or the equivalents thereof.

What is claimed is:

1. A suction cup device comprising:
   a case;
   a suction cup including a surface on one side in a thickness direction thereof being a suction surface and a surface on an opposite side being a back surface;
   a displacement mechanism provided in said case to support a central part of the suction cup in a radial direction of said back surface of said suction cup such that said central part is displaced in said thickness direction by an actuation of the displacement mechanism; and
   a contact part provided in said case which contacts a part of a surface to be sucked outside of a suction contact part of said surface to be sucked when said suction surface makes suction contact with said surface to be sucked,
   wherein said contact part includes
      a plurality of contact elements spaced from each other around a circumference of said suction cup and contacting said surface to be sucked when said suction surface makes said suction contact with said surface to be sucked.

2. The suction cup device as set forth in claim 1, wherein each of the said contact elements include:
   mutually independent members attached to a plurality of parts of said case spaced at intervals around the circumference of said suction cup.

3. The suction cup device as set forth in claim 1, wherein said contact elements are formed from an elastic material.

4. The suction cup device as set forth in claim 1, wherein said displacement mechanism includes:
   a shaft projected from said back surface of said suction cup in a direction for spacing away from said back surface along a center axis of said suction surface;
   a male screw formed at an outer peripheral surface of said shaft; and
   a rotational dial which is screw engaged with said male screw and which varies a distance between said case and said central part of said suction cup in a longitudinal direction of said shaft by being rotated.

5. The suction cup device as set forth in claim 4, wherein said case includes:
   an upper wall; and
   a peripheral wall perpendicularly extended from a periphery of said upper wall;
   said upper wall and said peripheral wall form a containing space;
   said dial is disposed on a lower side of said upper wall in said containing space, and said suction cup is disposed on lower side of said dial;
   a part of an outer peripheral part of said dial protrudes through an opening provided in said peripheral wall to an outside of said peripheral wall so as to be rotatable; and
   each of the said contact elements include:
      mutually independent members provided at parts of the lower end of said peripheral wall spaced at intervals around a circumference of said peripheral wall.

6. The suction cup device as set forth in claim 5, wherein said case has a structure in which an upper split body including said upper wall, an upper half of said peripheral wall, and a lower split body having a lower half of said peripheral wall are coupled; and
said dial is disposed between said upper split body and said lower split body.

7. The suction cup device as set forth in claim 1, wherein said displacement mechanism includes:
   a shaft projected from said back surface of said suction cup in a direction to space away from said back surface along the center axis of said suction surface;
   a male screw formed at an outer peripheral surface of said shaft; and
   a rotational dial which is screw engaged with said male screw and which varies a distance between said case and said central part of said suction cup in a longitudinal direction of said shaft by being rotated;

said case includes:
an upper wall, and
a peripheral wall perpendicularly extended from a periphery of said upper wall;
said upper wall and said peripheral wall form a containing space;
said dial is disposed on a lower side of said upper wall in said containing space, and said suction cup is disposed on lower side of said dial;
a female screw for screw engagement with said male screw is provided at a central part of said dial;
an upper surface of said dial fronting on the lower side of said upper wall is provided, at a part in periphery of said female screw, with a boss part rotatably supported by a central hole of said suction cup; and
each said contact element includes:
each of mutually independent members provided at parts of a lower end of said peripheral wall which are spaced at intervals in a circumferential direction of said peripheral wall.

8. The suction cup device as set forth in claim 1,
wherein
said displacement mechanism comprises:
a shaft projected from said back surface of said suction cup in a direction for spacing away from said back surface along the center axis of said suction surface;
a male screw formed at an outer peripheral surface of said shaft; and
a rotational dial which is screw engaged with said male screw and which varies a distance between said case and said central part of said suction cup in a longitudinal direction of said shaft by being rotated;
said case includes:
an upper wall, and
a peripheral wall perpendicularly extended from a periphery of said upper wall,
said case includes:
an upper split body and a lower split body coupled to each other,
said upper split body includes:
said upper wall, and
an upper half of said peripheral wall,
said lower split body includes:
a lower half of said peripheral wall, and
an intermediate wall provided at an upper end of said lower half so as to face said upper wall,
said upper wall and said peripheral wall form a containing space,
said dial is disposed on lower side of said upper wall and on an upper side of said intermediate wall in said containing space, and said suction cup is disposed on the lower side of said intermediate wall,
a part of an outer peripheral part of said dial protrudes through an opening provided in said peripheral wall to an outside of said peripheral wall so as to be rotatable, and
each of the said contact elements include:
each of mutually independent members provided at parts of a lower end of said peripheral wall which are spaced at intervals in a circumferential direction of said peripheral wall.

9. The suction cup device as set forth in claim 1,
wherein said case is provided with a pressing member which makes contact with an outer peripheral part of said back surface of said suction cup and presses said outer peripheral part against said surface to be sucked, in a condition where said suction surface is in suction contact with said surface to be sucked.

10. The suction cup device as set forth in claim 1,
wherein
said displacement mechanism includes:
a shaft projected from said back surface of said suction cup in a direction for spacing away from said back surface along a center axis of said suction surface;
a male screw formed at an outer peripheral surface of said shaft; and
a rotational dial which is screw engaged with said male screw and which varies the distance between said case and said central part of said suction cup in the longitudinal direction of said shaft by being rotated;
said case includes:
an upper wall, and
a peripheral wall perpendicularly extended from a periphery of said upper wall;
said case includes:
an upper split body and a lower split body coupled to each other,
said upper split body includes:
said upper wall, and
an upper half of said peripheral wall,
said lower split body includes:
a lower half of said peripheral wall, and
an intermediate wall provided at an upper end of said lower half so as to face said upper wall,
said intermediate wall is provided with a hole having a size corresponding to an outer peripheral part of said suction cup,
said upper wall and said peripheral wall form a containing space,
said dial is disposed on a lower side of said upper wall and on an upper side of said intermediate wall in said containing space, and said suction cup is disposed on the lower side of said intermediate wall,
a part of an outer peripheral part of said dial protrudes through an opening provided in said peripheral wall to an outside of said peripheral wall so as to be rotatable,
each of the said contact elements include:
mutually independent members provided at parts of a lower end of said peripheral wall which are spaced at intervals in a circumferential direction of said peripheral wall,
said case is provided with a pressing member which makes contact with an outer peripheral part of said back surface of said suction cup and presses said outer peripheral part against said surface to be sucked, in a condition where said suction surface is in suction contact with said surface to be sucked, and
said pressing member is fitted to an inner peripheral edge of said hole formed in said intermediate wall.

11. The suction cup device as set forth in claim 1,
wherein said case includes
an upper wall, and
a plurality of peripheral walls which are perpendicularly extended from the periphery of said upper wall and are spaced at intervals in the circumferential direction of said upper wall; and
said plurality of contact elements are attached to the lower ends of said peripheral walls.

12. The suction cup device as set forth in claim 1, wherein said case includes
- an upper wall, and
- a plurality of peripheral walls which are perpendicularly extended from the periphery of said upper wall and are spaced at intervals in the circumferential direction of said upper wall;

said plurality of contact elements are attached to the lower ends of said peripheral walls;

said upper wall is provided with a hole in the center thereof; and said displacement mechanism includes
- a shaft projected from said back surface of said suction cup in a direction for spacing away from said back surface along the center axis of said suction surface, said shaft protruding through said hole in said upper wall to the upper side of said upper wall,
- a male screw formed at an outer peripheral surface of said shaft protruding to the upper side of said upper wall, and
- a rotational dial screw engaged with said male screw of said shaft protruding to the upper side of said upper wall.

13. The suction cup device as set forth in claim 1, said case includes
- an upper wall, and
- a plurality of peripheral walls which are perpendicularly extended from the periphery of said upper wall and are spaced at intervals in the circumferential direction of said upper wall;

said plurality of contact elements are attached to the lower ends of said peripheral walls;

said upper wall is provided with a hole in the center thereof; and said displacement mechanism has
- a shaft projected from said back surface of said suction cup in a direction for spacing away from said back surface along the center axis of said suction surface,
- a cap attached to the tip of said shaft, and
- a coil spring provided between said upper wall and said cap in the state of being wound around said shaft, said coil spring energizing said upper wall and said cap in directions for spacing them away so as to bring said contact part into contact with said back surface of said suction cup.

14. The suction cup device as set forth in claim 1, wherein said suction cup is provided with a detaching piece extending outwards in a radial direction of said suction cup; and said piece protrudes between said plurality of contact elements to an outside of said case.

15. The suction cup device as set forth in claim 1, wherein said suction cup includes:
- a suction cup body, and
- a gel layer;

said suction cup body is formed from an elastic material and includes said back surface, and said gel layer is formed from a gel and attached to said suction cup body so as to form said suction surface.

* * * * *